United States Patent
Gross et al.

(10) Patent No.: US 6,754,577 B2
(45) Date of Patent: Jun. 22, 2004

(54) METHOD AND CONTROL APPARATUS FOR OPERATING AN INTERNAL COMBUSTION ENGINE

(75) Inventors: Jochen Gross, St. Wendel (DE); Lutz Reuschenbach, Stuttgart (DE); Georg Mallebrein, Korntal-Muenchingen (DE); Eberhard Klein, Plochingen (DE); Michael Drung, Muehlacker (DE); Lionel Martin, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/299,852

(22) Filed: Nov. 20, 2002

(65) Prior Publication Data

US 2003/0097214 A1 May 22, 2003

(30) Foreign Application Priority Data

Nov. 20, 2001 (DE) .......................................... 101 56 593
Mar. 23, 2002 (DE) .......................................... 102 13 138

(51) Int. Cl.$^{7}$ ............................................. F02D 41/00
(52) U.S. Cl. ........................ 701/103; 701/115; 123/436
(58) Field of Search ................................. 701/103, 115, 701/102; 123/480, 478, 436

(56) References Cited

U.S. PATENT DOCUMENTS 6,308,683 B1 * 10/2001 Pursifull et al. ............ 123/478
6,513,495 B1 * 2/2003 Franke et al. ............... 123/436

* cited by examiner

Primary Examiner—Hieu T. Vo
(74) Attorney, Agent, or Firm—Walter Ottesen

(57) ABSTRACT

An internal combustion engine includes a combustion chamber, a crankshaft and inlet and outlet valves. The engine is operated with a method wherein a fresh air charge (rl) of the combustion chamber and the engine rpm (nmot) are considered when computing a pressure (ps) in a region lying upstream of the inlet valve. The computation is done by utilizing at least one of thermodynamic equations and flow equations at at least one discrete time point during a work cycle of the engine. Or, a pressure (ps) in the above region and the rpm (nmot) of the crankshaft are considered when computing the fresh air charge (rl) of the combustion chamber by utilizing one of thermodynamic equations and flow equations at at least one discrete time point during a work cycle of the engine.

18 Claims, 5 Drawing Sheets

METHOD AND CONTROL APPARATUS FOR OPERATING AN INTERNAL COMBUSTION ENGINE

FIELD OF THE INVENTION

The invention relates to a method for operating an internal combustion engine wherein a fresh air charge of a combustion chamber is considered in the determination of a pressure in a region lying upstream from an inlet valve or, for the determination of the fresh air charge of a combustion chamber, the pressure in the region is considered lying upstream from the inlet valve. An rpm of a crankshaft of the engine is also considered in the determination.

BACKGROUND OF THE INVENTION

Such a method is known from the marketplace and is used, for example, in internal combustion engines having intake manifold injection. In internal combustion engines of this kind, either an air mass sensor is installed in the vicinity of a throttle flap or an intake pressure sensor is installed in an intake manifold. For the control of the engine, one needs as a rule, however, the intake manifold pressure as well as the fresh air charge. This means that the quantity, which in each case is not detected with a sensor, must be simulated by means of a model. The corresponding model is characterized as a "charge exchange model".

Based on this charge exchange model, the fresh air mass, which is inducted by the engine, is computed, for example, from the input quantity "intake manifold pressure". The computation takes place by means of a linear equation which includes a linear slope factor which is multiplied by the difference between the intake manifold pressure and a partial pressure of an internal residual gas.

By considering this internal residual gas, the fact is taken into account that the cylinder charge always contains a certain residual gas quantity from the last combustion. A certain portion of the exhaust gas from the exhaust-gas pipe again reaches the combustion chamber during an exhaust gas recirculation because of valve overlap. This can, for example, be achieved in that the outlet valve closes only after the piston of the engine passes the top dead center. In this way, a time span can result wherein the outlet valve and the inlet valve of a combustion chamber are opened simultaneously. This time span is characterized as an overlap angle referred to a camshaft revolution.

From the marketplace, functions are known for computing the internal partial pressure of the residual gas in the combustion chamber as well as for computing the linear slope factor with the aid of characteristic fields. The following are, for example, fed into the characteristic fields: the rpm of the crankshaft of the engine; the overlap angle of the camshafts and, if required, the overlap centroid of the camshafts. However, such characteristic fields require a relatively large memory space. Furthermore, there is a requirement in present day internal combustion engines that the fresh air charge and/or the intake manifold pressure be computed with still greater precision.

From the marketplace, simulation programs are known with which the thermal and dynamic conditions within the engine can be simulated in very small steps. The actual operations during charge exchange can be simulated rather well with such simulation programs. Even pulsations which occur during operation in the intake manifold and in the exhaust-gas system of the engine can be modeled. However, a computation in real time, for example, in a control apparatus of the engine is not possible with such simulation programs because of the high complexity of computation.

SUMMARY OF THE INVENTION

It is an object of the invention to improve a method of the type mentioned initially herein so that the desired quantity can be determined with this method with less complexity as to computation and, at the same time, with high precision.

The method of the invention is for operating an internal combustion engine including a combustion chamber, a crankshaft and inlet and outlet valves opening to the combustion chamber. The method includes the steps of: detecting the rpm (nmot) of the crankshaft; considering a fresh air charge (rl) of the combustion chamber and the rpm (nmot) when computing a pressure (ps) in a region lying upstream of the inlet valve by utilizing at least one of thermodynamic equations and flow equations at at least one discrete time point during a work cycle of the engine; or, considering a pressure (ps) in the region and the rpm (nmot) when computing the fresh air charge (rl) of the combustion chamber by utilizing one of thermodynamic equations and flow equations at at least one discrete time point during a work cycle of the engine.

The actual thermal and dynamic conditions in the combustion chamber and in the regions of the engine close to the combustion chamber can be determined with a very high precision with thermodynamic equations and/or flow equations. In contrast to the use of empirical equations and/or of characteristic fields, also the complex thermal and dynamic characteristics of modern internal combustion engines can be simulated very accurately. The computation load of a control apparatus with which functions of the engine are controlled (open loop and/or closed loop) are very low.

The formula or formulas, which result from the thermodynamic equations and/or flow equations for the computation of the fresh air charge and/or of the pressure, need only be computed once during a work cycle of the engine. A continuous small-stepped computation of the instantaneous thermal and dynamic condition in the engine is not necessary in the method of the invention as it is required in conventional simulation programs utilizing mainframe equipment. Furthermore, the influence of the instantaneous temperature of the supplied fresh gas as well as the temperature of the exhaust gas can be simulated physically in a simple manner which likewise contributes to the accuracy of the computed result.

In a first embodiment of the invention, it is suggested that a remainder gas be considered in the computation which is present in the combustion chamber after the closing of the inlet valve. Such a remainder gas is almost always present to a slight extent and is especially present however when the engine has an internal or external exhaust-gas recirculation. In such an internal exhaust-gas recirculation, the opening time point of the inlet valve and/or the closing time point of an outlet valve is so placed that the combustion chamber is filled at the start of a new work cycle not only with fresh air but also with remainder exhaust gas coming from a previous combustion. The flame temperature in the combustion chamber can be reduced by the remainder gas and therefore the formation of nitrous oxide is reduced. The consideration of this remainder gas, which is present in the combustion chamber, is very well possible with the method of the invention.

In a further embodiment, it is suggested that, in the computation, at least one of the following is considered: a residual remaining gas, which is present in the combustion chamber after the closing of the inlet valve and a reaspirated remaining gas, which is present in the combustion chamber after the closing of the inlet valve. In this way, the accuracy in the computation of the fresh air charge or of the pressure in the region lying upstream from the inlet valve is improved still further. With the term "upstream", that region is meant which is disposed between the inlet valve and the beginning of the intake manifold independently of whether the flow is actually from the intake manifold into the combustion chamber or from the combustion chamber into the intake manifold.

The residual remainder gas is understood to be that remainder gas which is trapped in the combustion chamber volume at combustion chamber temperature and under exhaust-gas counterpressure at the time point of the closing of the outlet valve of the engine. Reaspirative remainder gas is understood to be the remainder gas which flows during the valve overlap (that is, when the inlet and outlet valves are simultaneously open) from a region, which lies downstream of the outlet valve, through the combustion chamber into the region lying upstream from the inlet valve. The reaspirative remainder gas superposes with the residual remainder gas.

The sum of the residual and reaspirative remaining gases defines the total internal remaining gas of the engine. With the subdivision of the remainder gas into a residual component and a reaspirative component, comparatively simple thermodynamic and/or flow equations can be used for computing the respective components. Furthermore, the influences on the various remaining gas components, such as the switching time point of the inlet and outlet valves and the valve overlap, can be still better considered.

The temperature of the gas mixture disposed in the combustion chamber can be determined based on the mixture formula:

$$T_{mix} = \frac{\sum_i m_i * T_i}{\sum_i m_i}$$

while considering the mass components of the residual remaining gas and/or the mass components of the reaspirative remaining gas and the fresh air and the corresponding temperatures. This formula can be easily computed in the control apparatus and offers good results.

It is especially preferred when, for computing the quantity of the reaspirative remainder gas, which is disposed in the combustion chamber, it is assumed that in specific operating states of the engine, gas from a region, which lies downstream from the outlet valve, can flow through an equivalent throttle into the region which lies upstream of the inlet valve. The quantity of the backflowing gas is computed from an overcritical mass flow, which flows through this throttle. The overcritical mass flow is dependent upon at least an overlapment of the opening angle of the inlet valve with the closing angle of the outlet valve; on a temperature of the gas in the region lying downstream from the outlet valve; on a pressure of the gas in the region lying upstream of the outlet valve; and/or on the ratio of the pressure of the gas in the region, which lies downstream from the outlet valve, to the pressure of the gas in the region lying upstream from the inlet valve.

At this point, it is noted that the term "downstream" always refers to the region which is disposed between the outlet valve and the end of the exhaust-gas pipe independently of whether the flow is actually from the combustion chamber into the exhaust-gas pipe or from the exhaust-gas pipe into the combustion chamber. The term "downstream" therefore refers to the direction of the main flow.

The above-mentioned model-like assumption corresponds very well to the actual conditions of the internal combustion engine. The flow of the exhaust gases through the opening of the outlet valve and through the combustion chamber and through the opening of the inlet valve can be very well expressed by a flow of a gas through an equivalent throttle. Such a flow through a throttle can be computed with high precision with the known thermodynamic and aerodynamic equations. The characteristics of the equivalent throttles can be determined in experiments.

The overcritical mass flow can also be dependent upon the position of the centroid of the intersect region of the two valve curves. If the closing speed of the outlet valve is equal to the opening speed of the inlet valve, then the centroid lies precisely below the tip of the approximately triangular intersect region. The centroid shifts when there is a closing speed different from the opening speed and therefore the time point shifts correspondingly at which the above-mentioned values are detected.

It is also advantageous when the overcritical mass flow is multiplied by the output value of a characteristic line into which is fed the ratio of the pressure in a region, which lies downstream of the outlet valve, to the pressure in the combustion chamber or in a region which lies upstream of the inlet valve. Such a characteristic line is identified as "characteristic line outflow". This is an equation which is known from flow mechanics and which defines the flow through a diaphragm. With this equation, the flow performance is expressed in a simple manner in dependence upon the pressure difference on both sides of the diaphragm.

Here it is assumed that the gas, which flows back during the valve overlapment, has an exhaust-gas temperature and an exhaust-gas counterpressure. However, when pulsations of the pressure downstream of the outlet valve and upstream of the inlet valve occur in dependence upon the rpm of the crankshaft of the engine, then, during the overlapment, the pressure quotient can assume a value different from its mean value.

In order to consider the above in the computation, it is suggested that the ratio of the pressure of the gas, which lies upstream from the inlet valve, to the pressure of the gas in the region, which lies in the region downstream of the outlet valve, is multiplied by a corrective factor, which is dependent upon the rpm of the crankshaft of the engine.

In another embodiment of the invention, it is suggested that, in the computation, the measured or modeled pressure of the gas in the region, which lies downstream of the outlet valve, is corrected in dependence upon the rpm of the crankshaft of the engine and/or in dependence upon the closing angle of the outlet valve. In this way, the fact is taken into account that the pressure in the region, which lies downstream of the outlet valve, can pulsate in specific rpm ranges and/or when the outlet valve closes at a specific time point within the work cycle of the engine. These pressure pulsations are considered by the correction suggested in accordance with the invention.

In the simplest case, the correction can take place in that the measured or modeled pressure is multiplied by the output of a characteristic field whereinto the rpm of the crankshaft of the engine and the closing angle of the outlet valve are fed. With this correction, it can also be considered that a pressure compensation no longer takes place when the outlet valve closes clearly ahead of top dead center or clearly after top dead center of the piston assigned to the combustion chamber as well as at higher rpms of the crankshaft of the engine. If the outlet valve closes ahead of top dead center of the piston, then the pressure of the residual remaining gas is higher and, in contrast, if the outlet valve closes after top dead center, the pressure of the residual remaining gas in the combustion chamber is lower.

In the same manner, the measured or modeled pressure of the gas in the region, which lies upstream from the inlet valve, can be corrected in the computation in dependence upon the rpm of the crankshaft of the engine and/or in dependence upon the opening angle of the inlet valve.

It is further provided that the mass of the residual remaining gas is determined by means of the combustion chamber volume, which is present at the closing time point of the outlet valve or approximately at the center of the valve overlapment. It would also be possible to use that combustion chamber volume in the computation, which is present when the two valves have the same valve stroke. In all the above cases, the mass of the residual remaining gas can be computed accurately.

For the thermodynamic computations, it is especially preferred to proceed from the status equation for ideal gases. This makes possible significant simplifications in the computation without the result being affected thereby.

According to the invention, it can also be assumed that the thermal capacity and/or the isentropic exponent of the remaining gas or of the components of the remaining gas have the same values as those of fresh air. This assumption is possible because nitrogen is present for the most part in both gases.

A further approximation, which contributes to the simplified execution of the method of the invention, comprises that the state equation for ideal gases is used for adiabatic conditions. In the thermodynamic relationships, thermal transitions at the valves, on the walls of the combustion chamber as well as other components in the combustion chamber and in the regions close to the combustion chamber are neglected. This is possible without deteriorating the accuracy of the computation to any great extent.

The influence of thermal transitions on a detected or modeled temperature can, however, be considered, in the region upstream from the inlet valve by means of a corrective function. In this way, the computation is adiabatic, on the one hand, which makes possible a considerable simplification in the derivation of the equations, while, on the other hand, the influence of thermal transitions is not left completely unconsidered. The computation is thereby possible in a simple and yet precise manner.

The invention relates also to a computer program, which is suitable to carry out the above method when executed on a computer. Here, it is preferred when the computer program is stored on a memory and especially on a flash memory.

The invention also relates to a control apparatus (open loop and/or closed loop) for operating an engine. For such a control apparatus it is suggested that it include a memory on which a computer program of the above kind is stored.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
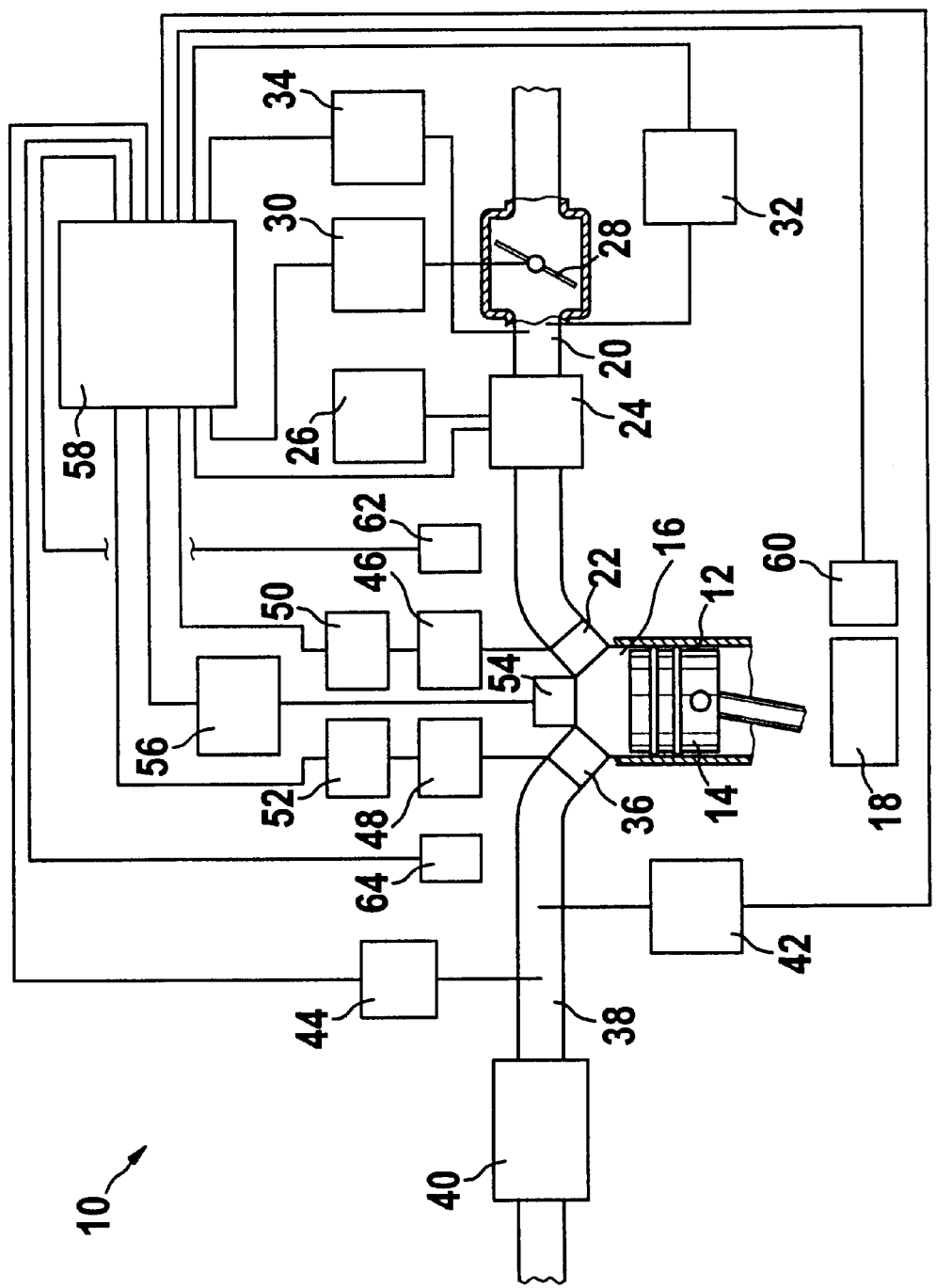
FIG. 1 is a schematic of an internal combustion engine.

FIG. 1 shows an internal combustion engine which is referred to overall by reference numeral 10. The engine includes several cylinders of which only that cylinder is shown having the reference numeral 12. A piston 14 is slidably guided in the cylinder 12 and delimits a combustion chamber 16. The piston 14 is connected via a connecting rod 15 to a crankshaft represented schematically by block 18.

Fresh air is supplied to the combustion chamber 16 via an intake manifold 20 and an inlet valve 22. An injection nozzle 24 is provided in the intake manifold 20 and is connected to a fuel system 26. A throttle flap 28 is mounted upstream from the injection nozzle 24 and can be moved by a positioning motor 30 into a desired position. Between the injection nozzle 24 and the throttle flap 28, the temperature of the supplied fresh air is detected by a sensor 32 and the pressure of the supplied fresh air is detected by a sensor 34.

The hot combustion gases are discharged from the combustion chamber 16 via an outlet valve 36 and an exhaust-gas pipe or an exhaust-gas elbow 38. A catalytic converter 40 purifies the exhaust gases. The temperature of the exhaust gas is detected by a temperature sensor 42 and the pressure of the exhaust gas is detected by a pressure sensor 44 at a location between the outlet valve 36 and the catalytic converter 40.

The engine 10 includes a double continuous camshaft control. This means that the opening and closing time points of the inlet valve 22 and of the outlet valve 36 can be adjusted continuously. For this purpose, the inlet valve 22 is actuated by an inlet camshaft 46 and the outlet valve 36 is actuated by an outlet camshaft 48. During operation, the camshafts 46 and 48 can be so shifted by the actuators 50 and 52 that the respective desired closing and opening time points are present.

The air/fuel mixture, which is present in the combustion chamber 16 of the engine 10, is ignited by a spark plug 54 which, in turn, is driven by an ignition system 56.

The operation of the engine 10 is controlled by a control apparatus 58 (open loop and/or closed loop). The control apparatus 58 is connected at its input end to the temperature sensor 32 and the pressure sensor 34 in the intake manifold 20. Furthermore, the control apparatus receives signals from the temperature sensor 42 and from the pressure sensor 44 in the exhaust-gas elbow 38. A transducer 60 supplies signals from which the rpm of the crankshaft 18 and its angular position can be obtained. In the same manner, sensors 62 and 64 are provided which detect the angular position of the inlet camshaft 46 and the outlet camshaft 48, respectively. At the output end, the control apparatus 58 is connected to the injection nozzle 24, the positioning motor 30 of the throttle flap 28, the actuators 50 and 52 of the inlet camshaft 46 and the outlet camshaft 48, respectively, and to the ignition system 56.

In order to determine that fuel quantity which corresponds to the torque wanted by the user of the engine 10 and for which the desired mixture composition is reached in the combustion chamber 16, it is necessary to determine the quantity of the fresh air reaching the combustion chamber 16 in a work cycle. For this purpose, a sensor could also be used but is not utilized for reasons of cost when, as is the case here, a pressure sensor 34 is provided in the intake manifold 20. In an embodiment not shown, an air mass sensor is installed in the intake manifold in lieu of the pressure sensor. In this case, for the determination of the air charge of the combustion chamber, the pressure in the intake manifold would have to be determined from the detected signals.

Figure 2:
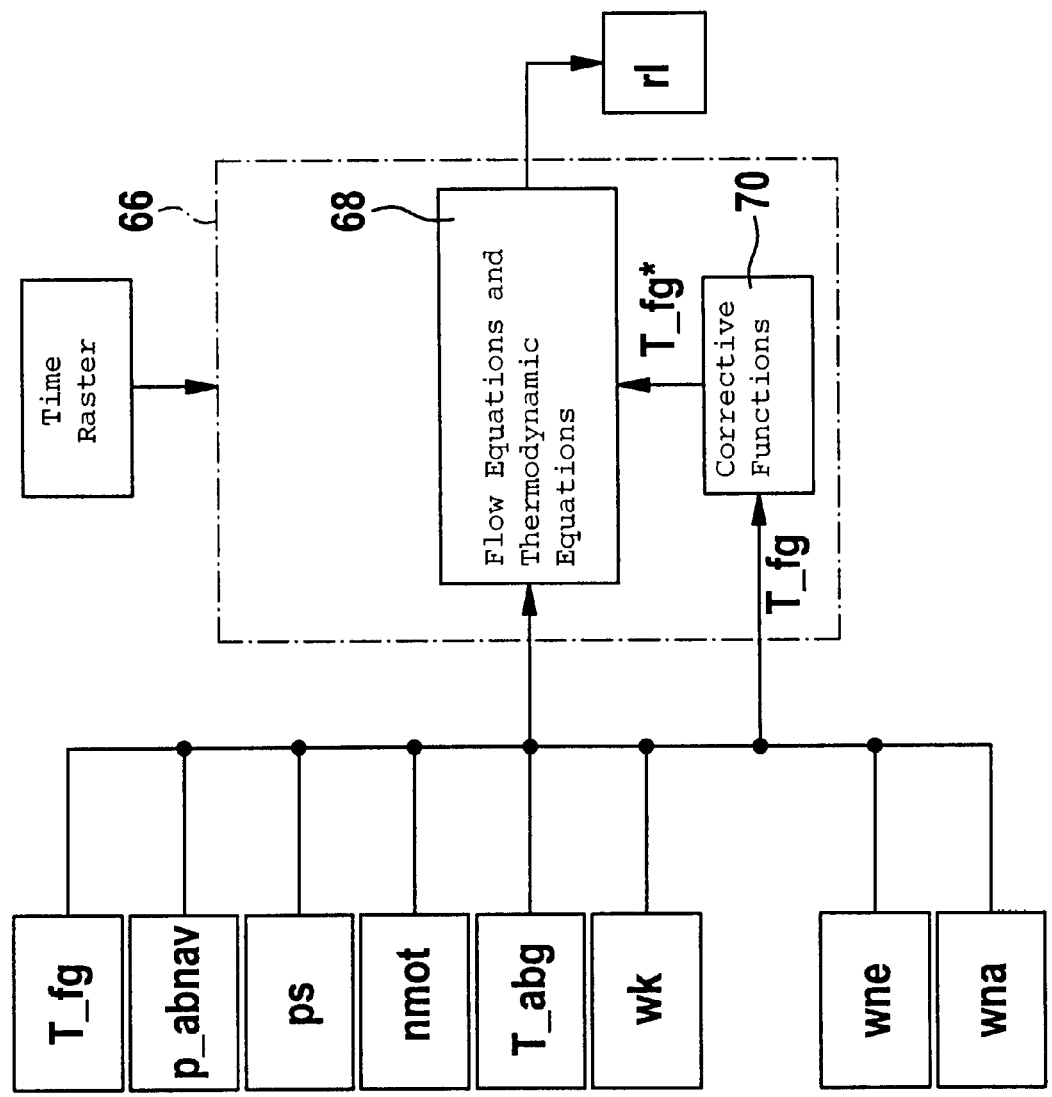
FIG. 2 is a block diagram showing the procedure in the determination of a standardized fresh air charge during operation of the engine of FIG. 1.

The determination of the fresh air charge rl (here, the fresh air charge is one standardized to standard conditions) is carried out in the manner shown in FIG. 2 in the internal combustion engine 10 shown in FIG. 1. The corresponding method is stored on a memory in the control apparatus 58.

Various measured values are made available by the sensors to the engine 10. The temperature sensor 32 in the intake manifold 20 measures the temperature T_fg of the intake air in the intake manifold 20. The pressure sensor 34 measures the pressure ps of the intake air in the intake manifold 20. The temperature sensor 42 measures the temperature T_abg of the exhaust gas in the exhaust-gas pipe 38 and, in the same manner, the pressure sensor 44 detects the pressure p_abnav of the exhaust gas in the exhaust-gas pipe 38. The transducer 60 supplies information as to the instantaneous rpm nmot of the crankshaft 18 as well as the angular position wk of the crankshaft 18. In the same manner, the transducers 62 and 64 supply information as to the angular positions wne or wna of the inlet camshaft 62 and the outlet camshaft 64, respectively.

These measured values are fed into a processing block 66. In this block, the standardized fresh air charge rl, which is present after the end of an induction stroke of the piston 14 in cylinder 12, is computed (reference numeral 68 in FIG. 2) from the measured values based on thermodynamic equations and on flow equations. Specific physical assumptions are made to simplify the computation. For example, it is assumed that adiabatic conditions are present in the combustion chamber 16 and in the regions in the intake manifold 20 and in the exhaust-gas pipe 38, which are close to the combustion chamber.

Thermal transitions from the components, which are present in these regions, on the flowing gas are therefore at first not considered. However, to nonetheless make possible a precise computation result, corrective functions 70 are also stored in the processing block 66 and these corrective functions compensate for inaccuracies, at least in part, caused by the simplification in the flow equations and thermodynamic equations 68. The temperature of the intake air is therefore correspondingly modified by the corrective functions.

Figure 3:
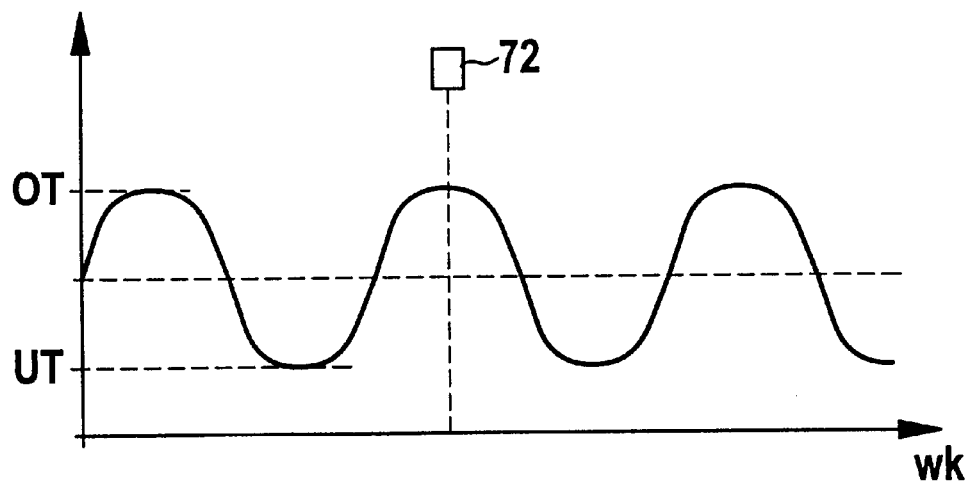
FIG. 3 is a waveform wherein the stroke of a piston is plotted as a function of an angle of a crankshaft.

The computation of the standardized fresh air charge rl does not take place continuously. Instead, the computation is carried out in the present embodiment during a work cycle of the cylinder 12 at a discrete time point, which is present in the region of top dead center of the piston 14, in advance of the start of an induction stroke (reference numeral 72 in FIG. 3). Here, the work cycle is understood to be the running through of all four strokes in a four-stroke internal combustion engine. The computation of the fresh air charge rl therefore takes place in a time raster angularly synchronized to the crankshaft 18.

Figure 5:
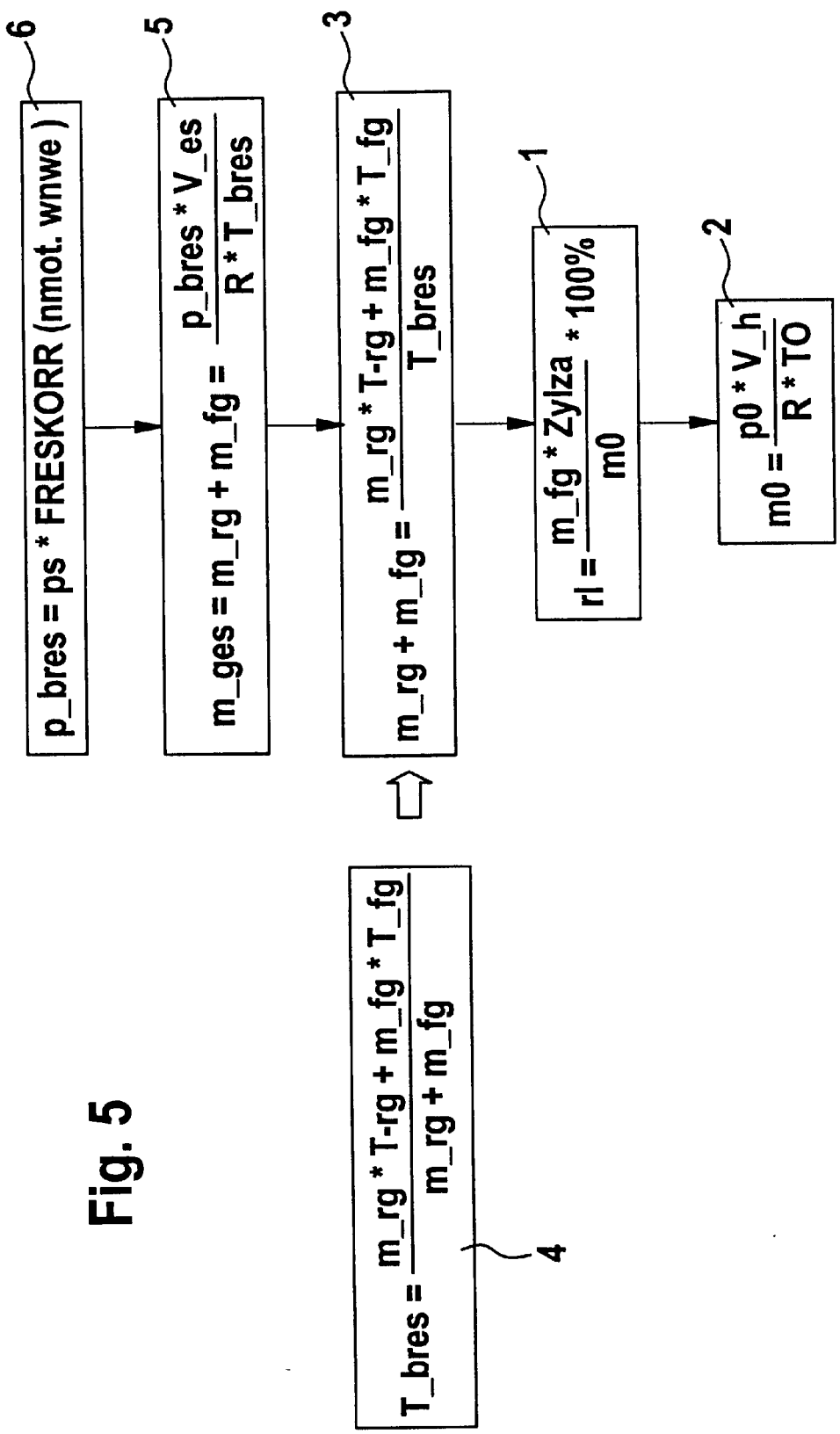
FIG. 5 is a graph showing the derivation of a thermodynamic equation for computing the fresh air charge of a combustion chamber of the internal combustion engine of FIG. 1; and, FIG. 6 is similar to FIG. 1 and shows the derivation in greater detail.
Figure 6:
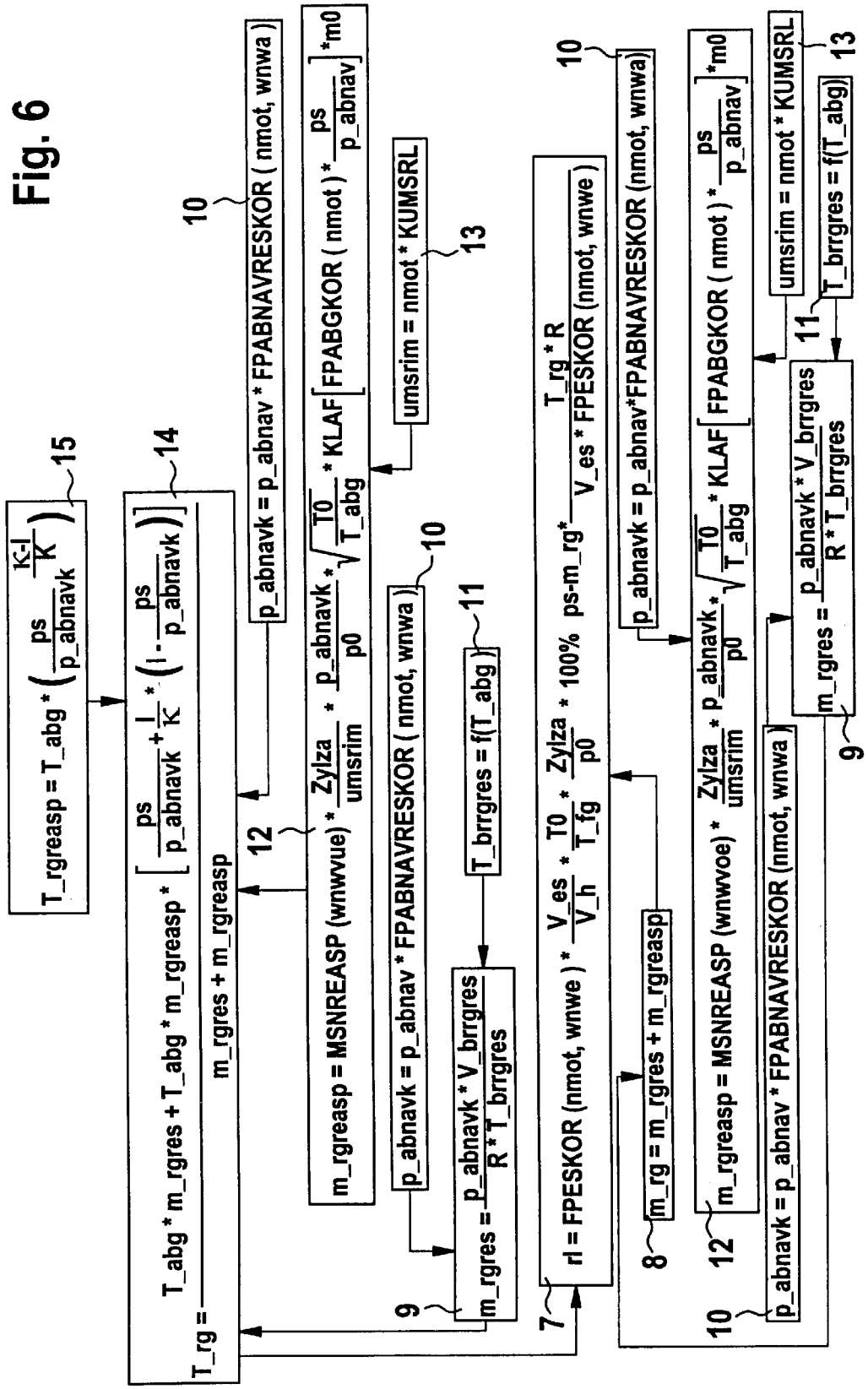

The computations in the processing block 66 are shown in FIGS. 5 and 6. In equation (1) in FIG. 5, the standardization of the fresh air charge rl is given. The mass m_fg of the supplied fresh air is referred to a standardized mass m0. The mass m0 results, in turn, from the ideal gas equation (2) at a standard pressure p0 of 1013.25 hPa, a standard temperature T0 of 273 Kelvin and the stroke volume V_h of the piston 14 of the engine 10. The factor Zylza is the number of cylinders of the engine 10.

The fresh air mass m_fg in equation (1) results from the equations (3) to (6) in FIG. 5. The equation (4) is the general gas mixture formula with which the temperature in the combustion chamber 16 is computed at a time point at which the inlet valve 22 closes. At this time point, a remaining gas mass m_rg is present in the combustion chamber 16 at a temperature T_rg and a fresh gas mass m_fg is present at a temperature T_fg.

As shown in equation (5), the total mass m_ges of the gas, which is present in the combustion chamber 16, is composed of the fresh air mass m_fg and the remaining gas mass m_rg. The equation is, in turn, derived from the ideal gas equation at a pressure p_bres in the combustion chamber 16 at the time point at which the inlet valve 22 closes. The remaining gas mass m_rg is explained in greater detail hereinafter.

Pressure pulsations can occur in the intake manifold 20 in dependence upon the rpm nmot of the crankshaft 18 of the engine 10 and the angle wnwe of the inlet camshaft 46 at which the inlet valve 22 opens. For this reason, the pressure p_bres does not correspond in each case to the intake manifold pressure ps, which is detected by the pressure sensor 34. This intake manifold pressure ps is therefore corrected in correspondence to equation (6) by a characteristic field FPESKORR in dependence upon the rpm nmot and in dependence upon the opening angle wnwe of the intake valve 22.

The remaining gas mass m_rg will now be explained.

The internal combustion engine 10 shown in FIG. 1 includes a so-called internal exhaust-gas recirculation to reduce the nitrous oxides in the exhaust gas of the engine. With respect to this, it is understood that a part of the exhaust gas from the exhaust-gas pipe 38 again arrives in the combustion chamber 16 or does not at all leave the combustion chamber 16. That exhaust-gas component, which remains in the combustion chamber 16, becomes residual remainder gas and that exhaust gas component, which is drawn back by suction into the combustion chamber 16, is reaspirative remaining gas (see equation (8) in FIG. 6).

Figure 4:
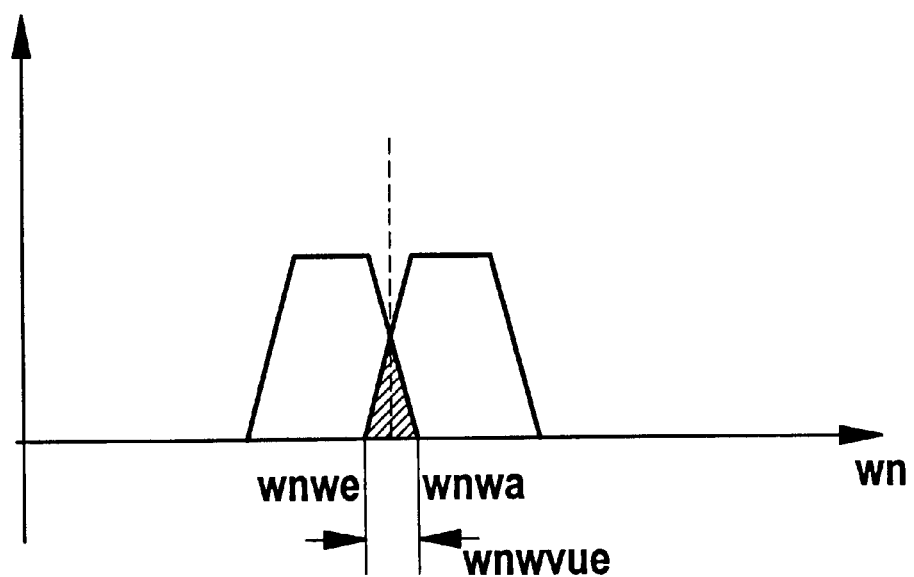
FIG. 4 is a diagram showing the valve position of an inlet valve and an outlet valve of the internal combustion engine of FIG. 1 plotted as a function of the angle of a camshaft.

The mass m_rgres of the residual remainder gas and m_rgreasp of the residual remaining gas is determined by the closure angle wnwa of the outlet valve 36 and the opening angle wnwe of the inlet valve 22 and the valve overlapment wnwvue resulting therefrom (see FIG. 4).

The equation (7) in FIG. 6 results when the equations (2) to (6) are placed in the equation (1) in FIG. 5. The remaining gas mass m_rg can be determined with the aid of equations (8) to (13) in FIG. 6 below the equation (7). The mass m_rgres of the residual remaining gas is determined by means of the ideal gas equation (9). Here, it is assumed that, normally, shortly before closing of the outlet valve 36, the pressure of the residual remainder gas is equal to the pressure of the exhaust gas in the exhaust-gas pipe 38. The pressure in the exhaust-gas pipe 38 is detected by the pressure sensor 44.

If, however, the outlet valve 36 closes before top dead center or clearly after top dead center, then this assumption is no longer entirely correct. The same applies to high rpms of the crankshaft 18. For this reason, the measured value p_abnav of the pressure sensor 44 is multiplied by the output of a characteristic field FPABNAVRESKOR, whereinto, on the one hand, the rpm nmot of the crankshaft 18 is fed and, on the other hand, the closing angle wnwa of the outlet valve 36 is fed (see equation 10).

A case distinction is made in the determination of the volume V_brrgres which is used in the equation (9) set forth hereinafter.

If the outlet valve 36 closes before the inlet valve 32 opens (that is, when no valve overlapment is present), the volume V_brrgres is equal to the volume of the combustion chamber 16 at the time point at which the outlet valve 36 closes. However, if the inlet valve 22 opens before the outlet valve 36 closes (this case is shown in FIG. 4 by the valve overlapment wnwvue), that volume of the combustion chamber 16 is assumed for the volume V_brrgres which is present at the mid time point between the opening time point of the inlet valve 22 and the closing time point of the outlet valve 36. It would also be possible to use that volume which is present at a time point at which the strokes of the two valves are equal. The temperature T_brrgres, which is used in equation (9) is that temperature, which is detected by the temperature sensor 42 at the time points mentioned already in connection with the volume V_brrgres.

The determination of the mass m_rgreasp of the reaspirative remaining gas takes place in equation (12) in FIG. 6. In the determination of the mass of the reaspirative remaining gas, the simplifying assumption is first made that the flow from the exhaust-gas pipe 38 through the outlet valve 36 via the combustion chamber 16 and the inlet valve 22 into the intake manifold 20 corresponds to a flow through an equivalent throttle or through an equivalent diaphragm. This mass flow is present during the overlapping time span wnwvue, that is, between wnwe and wnwa (FIG. 4).

The opening, which is cleared during the overlapment, is transformed into an equivalent opening during the total work cycle. The corresponding constant mean mass flow has the standardized overcritical value MSNREASP. In the present case, the mass flow MSNREASP is therefore only dependent upon the overlapping angle wnwvue. It is, however, conceivable to also have a dependency upon the centroid of the overlapment area (hatched in area in FIG. 4). With respect to the temperature of the backflowing remaining gas, it is assumed that this temperature corresponds to the exhaust-gas temperature T_abg detected by temperature sensor 42.

The overcritical mass flow MSNREASP is multiplied in equation (12) by the output of a so-called "characteristic line outflow" (shortened "KLAF"). This characteristic line defines the flow through a diaphragm or a throttle location in dependence upon the pressure difference forward/rearward of the diaphragm or throttle position. It is further assumed that the exhaust gas, which flows back during the valve overlapment wnwvue, has the exhaust-gas counter-pressure p_abnavk.

Pressure pulses can occur in the exhaust-gas pipe 38 and in the intake manifold 20 during operation of the engine 10 and this is so especially at high rpm. For this reason, the pressure ratio ps/p_abnav is multiplied by the output of a characteristic line FPABGKOR wherein the rpm nmot is fed in which is detected by the transducer 60. The quantity umsrlm is a conversion factor with which a mass flow (kg/h) is converted into a percentage component of the combustion chamber charge at standard conditions. This, in turn, is derived from equation (13), wherein KUMSRL is a constant dependent upon stroke volume.

The temperature T_rg of the remaining gas is computed by means of the formulas which are given in FIG. 6 above the equation (7). The equation (14), in turn, corresponds to the mixture equation known from thermodynamics wherein the temperature T_rgreasp of the reaspirative remainder gas was determined by the Poisson equation (13). The equations (9) to (13) are likewise used for determining the temperature T_rg and are explained above.

As shown in FIGS. 5 and 6, the relative fresh air charge rl can be determined by computation with the measured values T_fg, p_abnav, ps, nmot, T_abg, wk (for determining the different volumes V_x), as well as wnwe and wnwa (from which, in turn, wnwvue can be derived). To simplify the thermodynamic equations, adiabatic conditions are assumed and it is assumed that the thermal capacity and the isentropic exponent (K) of the exhaust gas and the fresh air are equal. This assumption is correct because both gases comprise approximately 80% nitrogen.

The equations of a flow through a diaphragm are used to simplify the computation of the backflow of the exhaust gas into the intake manifold 20. This assumption too is correct because the gap of the outlet valve 36 and of the inlet valve 22 can be seen as equivalent diaphragms or throttle positions. The inaccuracies, which arise because of the assumption of adiabatic conditions, can essentially be compensated by the different corrective functions. The computations of the formulas (1) to (15) can be carried out very rapidly in the control apparatus 58. In the present embodiment, the computations are carried out once within a work cycle, namely, shortly before the start of the time stroke. The corresponding time span is identified in FIG. 3 by reference numeral 72. In an embodiment of a conventional angle-synchronized computation raster (not shown), this time point is shifted forward relative to the illustration in FIG. 3 by approximately 70°.

It is understood that the foregoing description is that of the preferred embodiments of the invention and that various changes and modifications may be made thereto without departing from the spirit and scope of the invention as defined in the appended claims.

What is claimed is:

1. A control apparatus for operating an internal combustion engine, the control apparatus comprising: a memory storing a computer program for carrying out a method for operating an internal combustion engine including a combustion chamber, a crankshaft and inlet and outlet valves opening to said combustion chamber, the method comprising the steps of:

detecting the rpm (nmot) of said crankshaft;

considering a fresh air charge (rl) of said combustion chamber and said rpm (nmot) when computing a pressure (ps) in a region lying upstream of said inlet valve by utilizing at least one of thermodynamic equations and flow equations at at least one discrete time point during a work cycle of said engine; or, considering a pressure (ps) in said region and said rpm (nmot) when computing said fresh air charge (rl) of said combustion chamber by utilizing one of thermodynamic equations and flow equations at at least one discrete time point during a work cycle of said engine.

2. A computer program comprising a method which can be carried out when said computer program is run on a computer, the method being for operating an internal combustion engine including a combustion chamber, a crankshaft and inlet and outlet valves opening to said combustion chamber, the method comprising the steps of:

detecting the rpm (nmot) of said crankshaft;

considering a fresh air charge (rl) of said combustion chamber and said rpm (nmot) when computing a pressure (ps) in a region lying upstream of said inlet valve by utilizing at least one of thermodynamic equations and flow equations at at least one discrete time point during a work cycle of said engine; or, considering a pressure (ps) in said region and said rpm (nmot) when computing said fresh air charge (rl) of said combustion chamber by utilizing one of thermodynamic equations and flow equations at at least one discrete time point during a work cycle of said engine.

3. The computer program of claim 2, wherein said computer program is stored on a memory including on a flash memory.

4. A method for operating an internal combustion engine including a combustion chamber, a crankshaft and inlet and outlet valves opening to said combustion chamber, the method comprising the steps of:

detecting the rpm (nmot) of said crankshaft;

considering a fresh air charge (rl) of said combustion chamber and said rpm (nmot) when computing a pressure (ps) in a region lying upstream of said inlet valve by utilizing at least one of thermodynamic equations and flow equations at at least one discrete time point during a work cycle of said engine; or, considering a pressure (ps) in said region and said rpm (nmot) when computing said fresh air charge (rl) of said combustion chamber by utilizing one of thermodynamic equations and flow equations at at least one discrete time point during a work cycle of said engine.

5. The method of claim 4, wherein a remainder gas (m_rg), which is present in said combustion chamber after closing of said inlet valve, is considered in the computation.

6. The method of claim 5, wherein at least one of a reaspirative remainder gas (m_rgreasp), which is present in said combustion chamber after closing of said inlet valve and a residual remainder gas (m_rgres), which is present in said combustion chamber after closing of said inlet valve, is considered in the computation.

7. The method of claim 6, wherein, for the computation of said mass component (m_rgreasp) of said reaspirative remainder gas, which is present in said combustion chamber, the assumption is made that, in specific operating states of said engine, gas can flow from a first region, which lies downstream of said outlet valve, through an equivalent throttle into the region, which lies upstream of said inlet valve; said component (m_rgreasp) of the back flowing gas is computed from an overcritical mass flow (MSREASP), which flows through said throttle; and, said overcritical mass flow (MSREASP) is dependent on: an overlapment (wnwvue) of the opening angle (wnwe) of said inlet valve with the closing angle (wnwa) of said outlet valve; a temperature of the gas in said region, which lies downstream from said outlet valve; a pressure of the gas in the region, which lies downstream of said outlet valve; and/or, a ratio of the pressure (p_abnav) of the gas in said region, which lies downstream of said outlet valve, to the pressure (ps) of the gas in the region, which lies upstream of said inlet valve.

8. The method of claim 7, wherein the overcritical mass flow is also dependent from the position of the centroid of the intercept region of the two valve curves.

9. The method of claim 7, wherein the overcritical mass flow (MSREASP) is multiplied by the output value of a characteristic line (KLAF) whereinto is fed the ratio of the pressure (p_abnav) in a region, which lies downstream of said outlet valve, to the pressure (ps) in the combustion chamber or in a region, which lies upstream of the inlet valve.

10. The method of claim 9, wherein the ratio of the pressure (ps) of the gas in the region, which lies upstream of the inlet valve, to the pressure (p_abnav) of the gas in the region, which lies downstream of the outlet valve, is multiplied by a corrective factor (FPABGKOR) which is dependent upon the rpm (nmot) of said crankshaft of said engine.

11. The method of claim 5, wherein the assumption is made that the temperature (T_bres) of the gas mixture disposed in said combustion chamber can be determined based on the mixture formula:

$$T_{mix} = \frac{\sum_i m_i * T_i}{\sum_i m_i}$$

while considering the mass components (m_rgres, m_rgreasp, m_fg) of the residual remainder gas and/or of the reaspirative remainder gas and the fresh air and respective temperatures (T_rgres, T_rgreasp, T_fg).

12. The method of claim 5, wherein, in the computation, the measured or modeled pressure (p_abnav) of the gas in the region, which lies downstream of said outlet valve, is corrected in dependence upon said rpm (nmot) of said crankshaft and/or in dependence upon the closing angle (wnwa) of said outlet valve.

13. The method of claim 5, wherein the mass (m_rgres) of the residual remainder gas is determined by means of the combustion chamber volume (V_es), which is present at the closing time point of the outlet valve or at approximately the center of the valve overlapment (wnwvue).

14. The method of claim 4, wherein, in the computation, the measured or modeled pressure (ps) of the gas in the region, which lies upstream of said outlet valve, is corrected in dependence upon said rpm (nmot) of said crankshaft and/or in dependence upon the opening angle (wnwe) of said inlet valve.

15. The method of claim 4, wherein one proceeds from the status equation for ideal gases in the thermodynamic computations.

16. The method of claim 15, wherein the assumption is made for the computations that the heat capacity and/or the isentropic exponent of the remainder gas or the components of the remainder gas have the same values as that of fresh air.

17. The method of claim 15, wherein the status equation for ideal gases is used for adiabatic conditions.

18. The method of claim 15, wherein the influence of heat transfers on a detected or modeled temperature is considered with a corrective function upstream of the inlet valve.

* * * * *